(12) United States Patent
Zhang et al.

(10) Patent No.: US 11,204,183 B2
(45) Date of Patent: Dec. 21, 2021

(54) VENTILATOR WITH DUAL FLOW PASSAGES

(71) Applicant: DALIAN UNIVERSITY OF TECHNOLOGY, Dalian (CN)

(72) Inventors: Tengfei Zhang, Dalian (CN); Facheng Li, Dalian (CN); Jihong Wang, Dalian (CN); Shugang Wang, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 246 days.

(21) Appl. No.: 16/611,759

(22) PCT Filed: May 28, 2018

(86) PCT No.: PCT/CN2018/088687
§ 371 (c)(1),
(2) Date: Nov. 7, 2019

(87) PCT Pub. No.: WO2019/011069
PCT Pub. Date: Jan. 17, 2019

(65) Prior Publication Data
US 2020/0116367 A1    Apr. 16, 2020

(30) Foreign Application Priority Data

Jul. 14, 2017 (CN) .......................... 201710567449.X

(51) Int. Cl.
*B01D 46/10* (2006.01)
*F24F 8/10* (2021.01)
(Continued)

(52) U.S. Cl.
CPC ................ *F24F 8/10* (2021.01); *F24F 13/28* (2013.01); *B01D 46/10* (2013.01);
(Continued)

(58) Field of Classification Search
CPC ....... B01D 46/10; B01D 2273/30; F24F 8/10; F24F 13/28; F24F 1/0071; F24F 13/20; F24F 7/007; E06B 2007/023
(Continued)

(56) References Cited

U.S. PATENT DOCUMENTS 4,714,197 A * 12/1987 Thayer .................. F02K 1/1223
239/265.19
4,964,575 A * 10/1990 Takata .................... A01C 15/04
239/655

(Continued)

FOREIGN PATENT DOCUMENTS

| CN | 105333556 A | 2/2016 |
|---|---|---|
| CN | 205606821 U | 9/2016 |

(Continued)

*Primary Examiner* — Minh Chau T Pham
(74) *Attorney, Agent, or Firm* — Muncy, Geissler, Olds & Lowe, P.C.

(57) ABSTRACT

The present invention discloses a ventilator with dual flow passages. There is a mode switcher on the partition board. The ventilator has a variety of operating modes, such as, the natural or mechanical driving mode according to outdoor wind speed, and single-effect or multi-effect filtration according to the outdoor air pollution conditions. The single-effect filtration uses only the primary-efficiency filter, while the three-effect filtration uses the primary-, medium-, and high-efficiency filters. The mode switcher on the partition board can open or close the by-pass baffle to bypass or go through the medium- and high-efficiency filters for switching between the single-effect and multi-effect filtration. In case some indoor pollution sources need to be removed quickly, the recirculated indoor air filtration can be run. In such situation, the primary-efficiency filter in the mechanically-driven flow passage is bypassed, while the fan drives indoor air passing the medium- and high-efficiency filters.

9 Claims, 7 Drawing Sheets

(51) Int. Cl.
    *F24F 13/20*     (2006.01)
    *F24F 13/28*     (2006.01)
    *F24F 1/0071*     (2019.01)
    *F24F 7/007*     (2006.01)
    *E06B 7/02*     (2006.01)

(52) U.S. Cl.
    CPC .... *B01D 2273/30* (2013.01); *E06B 2007/023* (2013.01); *F24F 1/0071* (2019.02); *F24F 13/20* (2013.01)

(58) Field of Classification Search
    USPC ..... 55/472, 473, 385.3; 62/244; 165/42, 202
    See application file for complete search history.

(56) References Cited

U.S. PATENT DOCUMENTS

| | | | |
|---|---|---|---|
| 6,723,970 B1 * | 4/2004 | Whipple, Jr. | F24C 15/2007 |
| | | | 126/21 A |
| 2005/0178128 A1 * | 8/2005 | Harwood | B60H 1/00478 |
| | | | 62/3.61 |
| 2006/0260783 A1 * | 11/2006 | Park | B60H 1/00521 |
| | | | 165/42 |

FOREIGN PATENT DOCUMENTS

| | | |
|---|---|---|
| CN | 106051943 A | 10/2016 |
| CN | 107543273 A | 1/2018 |
| KR | 100621688 B1 | 8/2006 |
| KR | 20070080622 A | 8/2007 |

\* cited by examiner

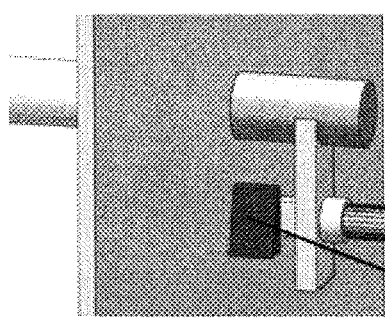 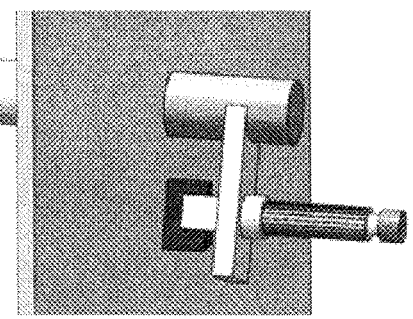
Figure 8(a)  Figure 8(b)
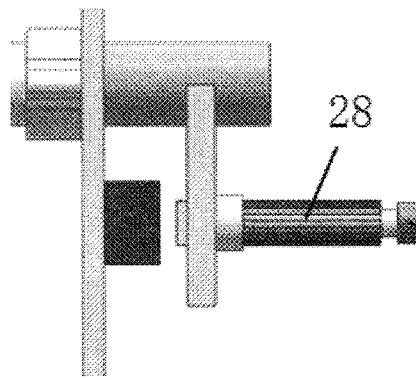 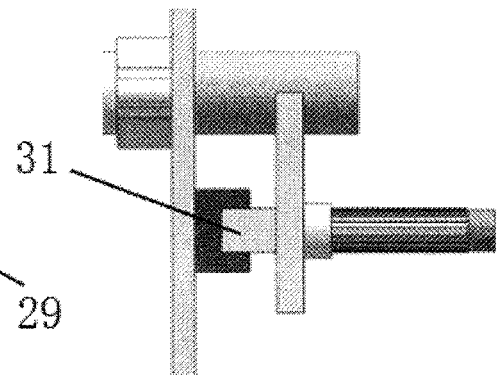
Figure 9(a)  Figure 9(b)
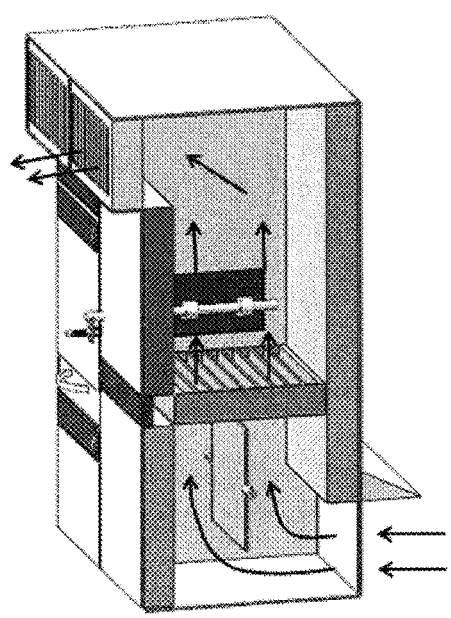
Figure 10

VENTILATOR WITH DUAL FLOW PASSAGES

FIELD OF THE INVENTION

The present invention belongs to the field of indoor air purification and ventilation, and particularly relates to a ventilator in multiple modes.

BACKGROUND

Buildings must be properly ventilated. However, a number of pollutants released indoors from low quality building materials or furnishing cause indoor pollutant concentrations higher than the national standards. In such context, more ventilation is required. Due to haze pollution outdoors, direct intake of the outdoor air will bring the outdoor particulate matters into the room. Therefore, it is necessary to develop a ventilation device that can not only draw the outdoor air, but also can filter and purify the drawn outdoor air, so as to effectively improve indoor air quality.

The market-available fresh air blowers commonly adopt high efficiency filtration. Though combination of primary, medium-efficiency, and high-efficiency particulate filtration or the pure high-efficiency particulate air (HEPA) filtration may be used, there is only one fixed operation mode. The above filtration has high purification efficiency, but the filters' service life is short. Medium and high efficiency filters can easily get into malfunction. Meanwhile, combination of primary, medium and high efficiency filtration, or just the HEPA filtration has a large flow resistance, so the rapid ventilation into the room cannot be offered. The present invention provides a ventilator with multiple operation modes. Although three different-efficiency filters have been adopted, the specific type of air filtration is run only under the exact demand. The filtration to the outdoor air by the three filters together is operated when the outdoor air is in moderate or severe pollution; when the outdoor air is slightly polluted, only the primary filter is adopted to filter the outdoor air. Such design can prolong the life of medium and high efficiency filters and increase ventilation rate. The natural ventilation mode is also designed to be used when the outdoor wind is strong enough. The natural ventilation may drive the primary filtration if course filtration is needed, which saves energy for ventilation and particle filtration. In addition, the mode of recirculated indoor air filtration is also designed, which purifies only the indoor air when the outdoor air is not required for a short while in some circumstances.

The mode switching is realized by rotating the baffle. Currently, the opening or shutting of baffles is operated manually or by electric control. The manual control is simple but requires human interruption. The use of motor or sensor for electric control will lead to increased expense. The proposed device adopts cams, compressed springs, sealing gasket and lock for mode switching. The sealing performance and service life of the mode switching are improved by using compressed spring for more accurate control.

The ventilator is able to adjust and stabilize the natural ventilation rate into a room. Currently, airflow rate regulation commonly adopts manual operation or electric control. The manual operation cannot adjust the airflow in real time in responding to the outdoor wind. The electric control has to use sensors for monitoring, which is not affordable for wide use. The present invention proposed a ventilator to stabilize the indoor ventilation rate based on the feedback control of the outdoor wind. Without using any sensor or electric device, the air intake can be automatically adjusted according to the external wind, so as to keep the indoor ventilation rate relatively stable and prevent excessive indoor ventilation.

The present invention is intended to solve the above mentioned existent problems and develops a ventilator with dual flow passages.

SUMMARY OF THE INVENTION

In view of the deficiencies of the prior art, the present invention provides a ventilator with dual flow passages that can filter the drawn outdoor air and has multiple operating modes.

The technical solutions of the invention are as follows:

A ventilator with dual flow passages, wherein the ventilator is divided into a naturally-driven flow passage and a mechanically-driven flow passage with a partition board between both passages; there is a mode switcher on the partition board, and the mode switcher includes a by-pass baffle, a controller to open or close the by-pass baffle. When the by-pass baffle is shut, the operating mode can be the single-effect natural filtration of the drawn outdoor air, three-effect mechanical filtration of the outdoor air, or recirculated indoor air filtration. When the by-pass baffle is opened, the mode of single-effect mechanical filtration of the outdoor air is run.

The naturally-driven flow passage contains a flow rate regulation baffle, primary-efficiency filter B and grille B. An outdoor air intake in the naturally-driven flow passage is located in the outdoor side of the bottom of the naturally-driven flow passage. The flow rate regulation baffle is pivoted at the bottom of the naturally-driven flow passage through a rotating shaft. The flow rate regulation baffle is vertical under reset state. The primary-efficiency filter B is above the flow rate regulation baffle. The grille B is located in the indoor side of the naturally-driven flow passage and above the primary-efficiency filter B. The grille B discharges the filtered air into the room at desirable directions.

The mechanically-driven flow passage contains a primary-efficiency filter A, a recirculated indoor air intake, a centrifugal fan, a medium-efficiency filter, a HEPA filter and grille A. The outdoor air intake in the mechanically-driven flow passage is at the bottom of the mechanically-driven flow passage in the outdoor side. Above the outdoor air intake in the mechanically-driven flow passage, the primary-efficiency filter A, centrifugal fan, medium-efficiency filter, and HEPA filter are located sequentially. The recirculated indoor air intake is located in the indoor side between the primary-efficiency filter and the centrifugal fan. By opening or closing the recirculated indoor air intake, the mode is switched between the recirculated indoor air filtration and the outdoor air HEPA filtration. The grille A is located on the indoor side of the mechanically-driven flow passage above the HEPA filter. The filtrated air is discharged into the room at the desirable direction by adjusting the grille. Exterior doors are designed, by opening which each filter can be unloaded and loaded for replacement.

The mode switcher is arranged above the primary-efficiency filter B in the naturally-driven flow passage. The mode switcher is also located between the centrifugal fan and the medium-efficiency filter in the mechanically-driven flow passage. The opening or shutting of the by-pass baffle is controlled manually or automatically by electrical devices.

Further, the by-pass baffle of the mode switcher is mounted at the opening on the partition board by the baffle rotating shaft and torsion spring. A sealing pad is arranged along the perimeter of the by-pass baffle to ensure good sealing of the by-pass baffle when the by-pass baffle is closed. The controller to open or close the by-pass baffle contains cams, cam rotating shaft, straight springs, screws, spring locks, position limiting blocks, spring blades and handles. The cam is pivoted on the cam rotating shaft for rotation, and rotates together with the cam; the by-pass baffle is closed when the cam is not rotated for use. The cam rotating shaft is parallel with the by-pass baffle and is located in the naturally-driven flow passage. One end of the cam rotating shaft is mounted to the outer shell of the ventilator and the other end of the rotating shaft passes through the inner shell of the ventilator and is connected to a handle. The spring lock and spring blade are arranged on the handle, and is coordinated with the position limiting block located on the shell of the ventilator (indoor side) to adjust the rotation angle of the cam. The screws are perpendicular to the by-pass baffle and located in the mechanically-driven flow passage. One end of the screw is mounted to the flow passage's surface, and the other end is coated with a straight spring. The spring is against a position limiting nut. The by-pass baffle is pressed by the other end of the straight spring.

Further, the reset state of the flow rate regulation baffle is in a vertical status. Meanwhile, the gravitational center of the flow rate regulation baffle is located below the rotating shaft, and the lower section of the flow rate regulation baffle is near the air intake in the naturally-driven flow passage. The rotating angle of the flow rate regulation baffle is limited to 0-90 degrees. In absence of wind, the flow rate regulation baffle is vertical, while the baffle can swing to different positions subject to wind blowing. When the baffle is vertical, the ventilation rate of the flow passage reaches the maximum. When the baffle is horizontal, the flow passage is nearly shut and the flow passage is the smallest. There is almost no ventilation when the baffle is horizontal.

Further, the flow resistance and particle removal efficiency of the primary, medium and HEPA filters are increasing sequentially.

A method for mode switching of ventilator with dual flow passages, wherein,

The mode for single-effect natural filtration of the outdoor air is as follows: the outdoor air first enters into the outdoor air intake in the naturally-driven flow passage, then passes the flow rate regulation baffle, the primary-efficiency filter, and finally reaches indoors after leaving the grille. The centrifugal fan, by-pass baffle, and the recirculated indoor air intake are not in use. This mode is suitable for mild outdoor air pollution and high outdoor wind speed.

The mode of three-effect mechanical filtration of the outdoor air is as follows: the outdoor air enters into the outdoor air intake of the mechanically-driven flow passage, passes the primary-efficiency, medium-efficiency and HEPA filters sequentially under the driven motion of the centrifugal fan, and then reaches indoors after leaving the grille A on the inner side of the mechanically-driven flow passage. The by-pass baffle and the recirculated indoor air intake are closed. This mode is suitable for the heavily polluted outdoor air conditions.

The mode of single-effect mechanical filtration of the outdoor air is as follows: the outdoor air enters into the outdoor air intake of the mechanically-driven flow passage, passes the primary efficiency filter A under the driven motion of the centrifugal fan, then the by-pass baffle into the naturally-driven flow passage, and finally reaches indoors after leaving the grille B. The recirculated indoor air intake is closed. This mode is suitable for medium outdoor air pollution without sufficient wind or when rapid indoor ventilation is needed.

The mode of recirculated indoor air filtration is as follows: the centrifugal fan draws the indoor air into the mechanically-driven flow passage, and then the air passes the medium-efficiency and HEPA filters, and finally reaches indoors after leaving from the grille A on the inner side of the mechanically-driven flow passage. In this mode, the recirculated indoor air intake is in use, while the by-pass baffle is closed. The mode is suitable for heavy pollution indoors and the outdoor air is not required occasionally.

The invention has the following beneficial effects:

1. A ventilator with dual flow passages provides multiple operating modes to assure indoor air quality according to the outdoor air pollution and meteorological conditions such as wind speeds. When the outdoor air is slightly polluted and the outdoor wind speed is relatively high, the mode of single-effect natural filtration of the outdoor air can be used, which roughly filters the outdoor air to meet the indoor air requirement by the primary-efficiency filter. When the outdoor air is heavily polluted, the mode of three-effect mechanical filtration of the outdoor air can be used to filter the outdoor air efficiently. The filtration efficiency to PM2.5 can reach more than 98%. When the outdoor air is slightly polluted and the wind speed is small or the room needs rapid ventilation, the mode of single-effect mechanical filtration of the outdoor air can be used. When the indoor air is polluted and it is not suitable to ventilate, the mode of recirculated indoor air filtration can be used. With a variety of operating modes for different pollution conditions, the ventilator is more energy-saving and efficient.

2. When the outdoor air is slightly polluted, the mode of single-effect filtration can be used to prolong the service life of medium-efficiency and HEPA filters, and a bigger ventilation rate can be obtained under the driving of the fan. The mode of natural filtration can reduce the energy consumption for ventilation in regions with strong outdoor winds.

3. The primary-efficiency filter in the naturally-driven flow passage can not only filtrate the outdoor air roughly, but also prevent the drawn air flowing backward to outdoors when the mode of single-effect mechanical filtration of the outdoor air is used. Similarly, in the mode of recirculated indoor air filtration, due to the flow resistance by the primary-efficiency filter below the centrifugal fan in the mechanically driven flow passage, the fan mainly draws the recirculated indoor air from the inside of the room instead the outdoor space. The drawn recirculated air passes the medium and HEPA filters for filtration and then is delivered into the room from the grille. The above two designs eliminate sealing baffles, which reduces initial investment costs and simplifies the structure.

4. The dual flow passages together with the mode switcher ensures independent operation of each modes and no influence among different modes. The design greatly reduces the size of the ventilator, switches the mode more easily, and results in more evident air cleaning and energy-saving effects.

DESCRIPTION OF DRAWINGS

FIG. 8(a) is an overall schematic view of the handle to operate the by-pass baffle when the by-pass baffle is closed.

FIG. 8(b) is an overall schematic view of the handle to operate the by-pass baffle when the by-pass baffle is opened.

FIG. 9(a) is a side view of the handle to operate the by-pass baffle when the by-pass baffle is closed.

FIG. 9(b) is a side view of the handle to operate the by-pass baffle when the by-pass baffle is opened.

FIG. 10 is a side view of the mode of single-effect natural filtration of the outdoor air.

In the above figures, 1 the primary-efficiency filter A; 2 recirculated indoor air intake; 3 centrifugal fan; 4 medium-efficiency filter; 5 HEPA filter; 6 grille A; 7 grille B; 8 primary-efficiency filter B; 9 flow rate regulation baffle; 10 outer cover door for the primary-efficiency filter A; 11 outer cover door for the medium-efficiency filter; 12 outer cover door for the HEPA filter; 13 outer cover door for the primary-efficiency filter B; 14 outer cover door for the recirculated indoor air intake; 15 rain cover; 16 outdoor air intake in the naturally-driven flow passage; 17 outdoor air intake in the mechanically-driven flow passage; 18 torsional spring; 19 baffle rotating shaft; 20 gasket; 21 by-pass baffle; 22 cam; 23 straight spring; 24 position limiting nut; 25 screw; 26 side walls of the ventilator; 27 cam rotating shaft; 28 handle; 29 spring lock; 30 position limiting block; 31 shrapnel.

DETAILED DESCRIPTION

The invention will be described in detail in conjunction with the drawings and specific embodiments.

Figure 1:
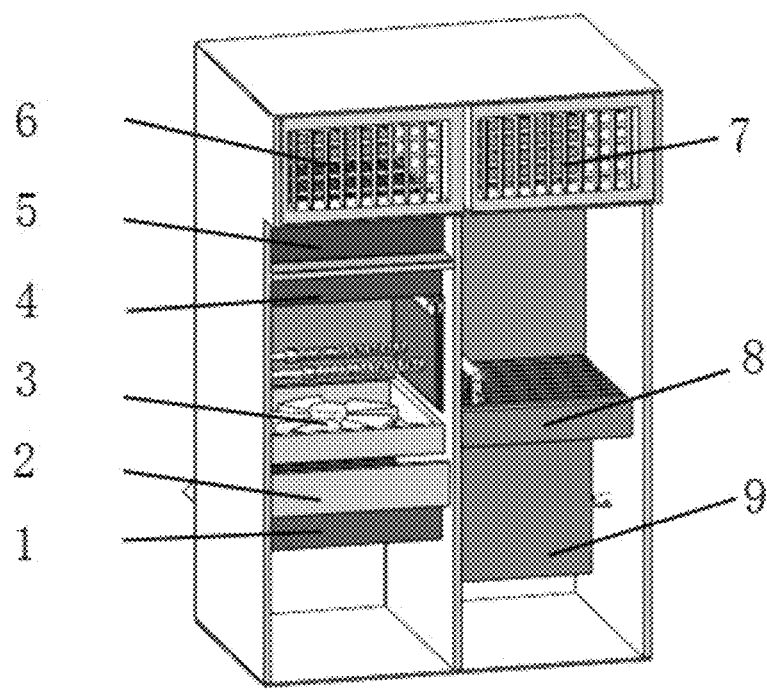
FIG. 1 is a cross-sectional view of the indoor appearance of the ventilator with dual flow passages.
Figure 2:
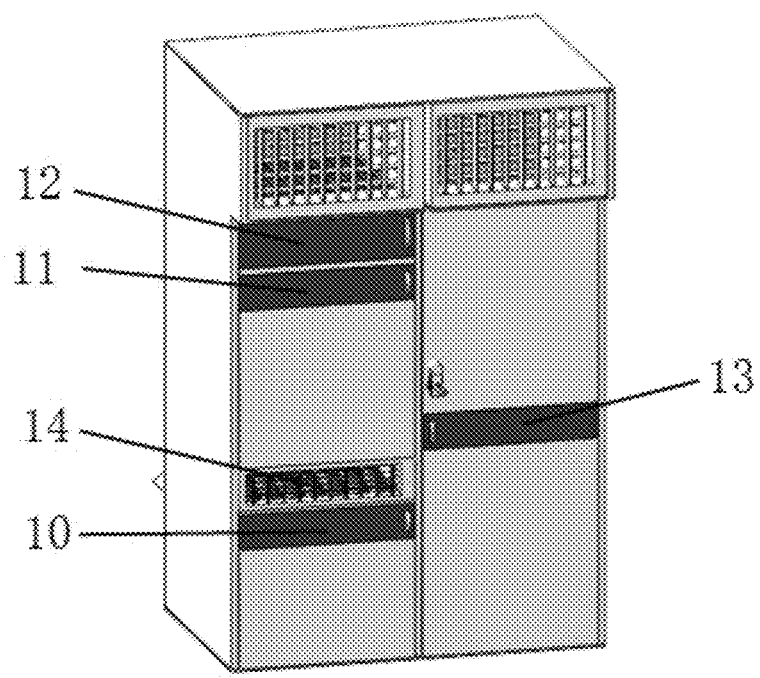
FIG. 2 is a non-cross-sectional view of the indoor appearance of the ventilator with dual flow passages.
Figure 3:
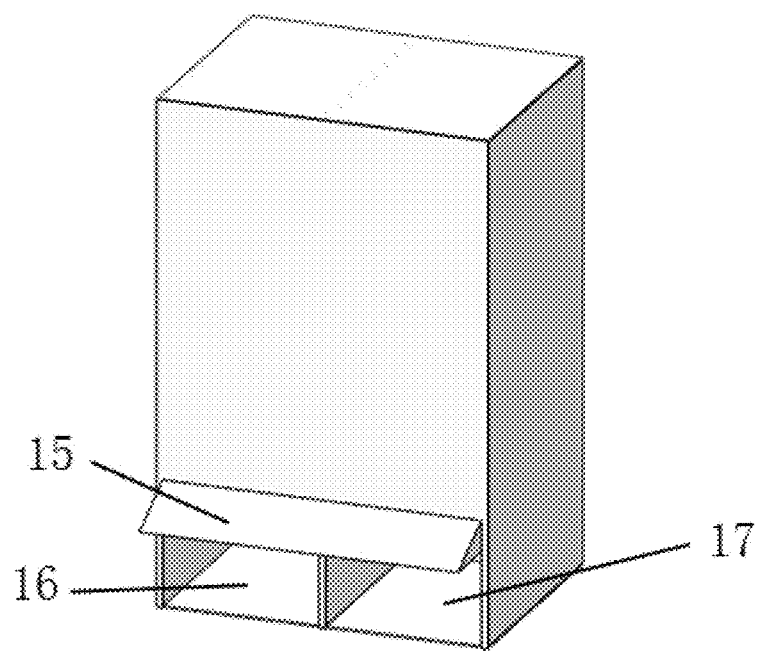
FIG. 3 is an overall schematic view of the outdoor appearance of the ventilator with dual flow passages.

A specific embodiment of the ventilator with dual flow passages is shown in FIGS. 1 and 2. The ventilator is divided into dual flow passages by the middle partition board. Based on the indoor side view, the ventilator comprises the left mechanically-driven flow passage and the right naturally-driven flow passage. The mechanically-driven flow passage includes the outdoor air intake 17, primary-efficiency filter A 1, centrifugal fan 3, medium-efficiency filter 4, HEPA filter 5, and grille A 6, in order from bottom to top. The naturally-driven flow passage includes the outdoor air intake 16, flow rate regulation baffle 9, primary-efficiency filter B 8 and grille B 7, in order from bottom to top.

Figure 4:
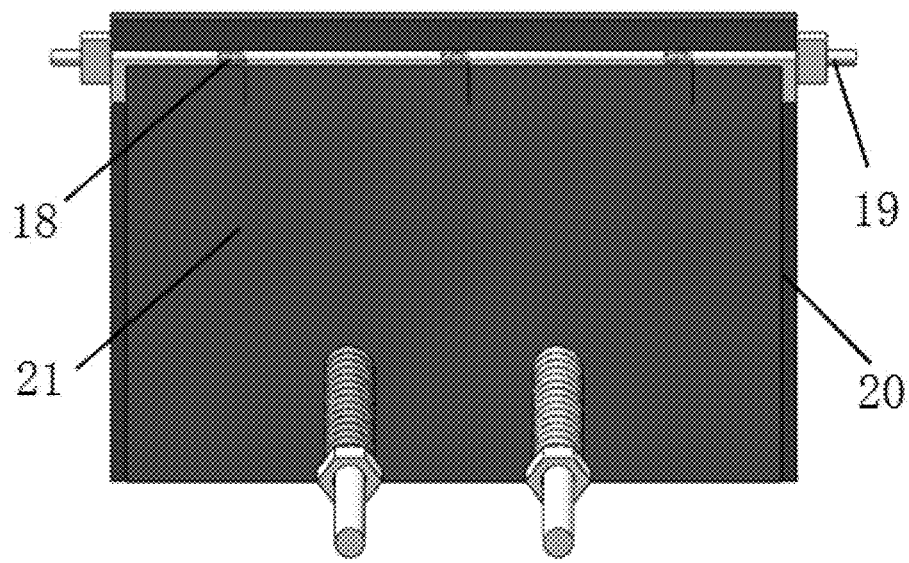
FIG. 4 is an overall schematic view of the by-pass baffle and spring.
Figure 5:
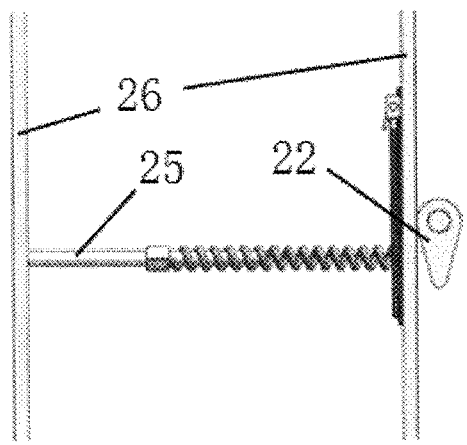
FIG. 5(a) is a side view of the by-pass baffle when the by-pass baffle is closed.
FIG. 5(b) is a side view of the by-pass baffle when the by-pass baffle is opened.
Figure 5:
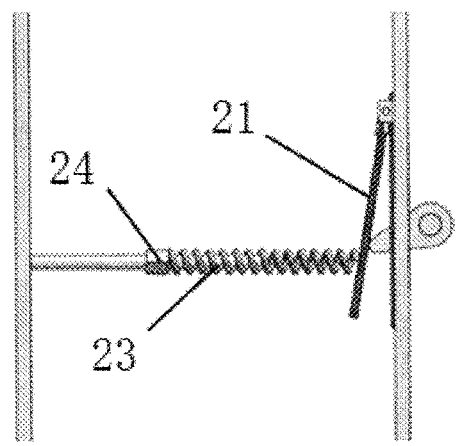
Figure 6:
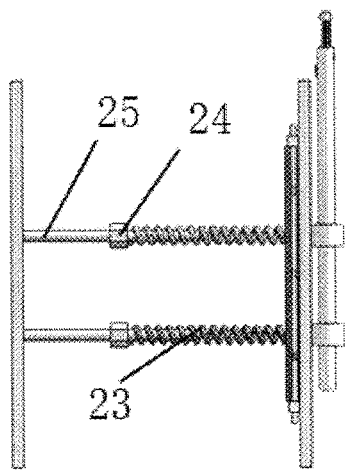
FIG. 6(a) is a top view of the by-pass baffle when it is closed.
FIG. 6(b) is a top view of the by-pass baffle when it is opened.
Figure 6:
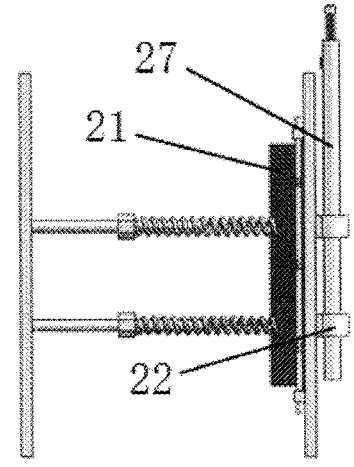

FIG. 4 is an overall schematic view of the by-pass baffle and spring. The upper end of the by-pass baffle 21 is pivoted on the baffle rotating shaft 22 and can be rotated around the rotating shaft. Torsion springs 18 are arranged on the baffle rotating shaft. The torsion springs 18 are in a stretched state when the baffle is shut to enhance the sealing of upper portion of the by-pass baffle. A gasket 20 is arranged between the baffle and the perimeter of the by-pass baffle on the partition board of the ventilator. FIG. 5(a) and FIG. 5(b) are side view of the by-pass baffle when closing and opening. FIG. 6(a) and FIG. 6(b) are top view of the by-pass baffle when closing and opening. On the left side of FIGS. 5 and 6, the side view and top view of the closed baffle are presented, respectively; and on the right side is for the opened baffle. The by-pass baffle 21 is located between the centrifugal fan and the medium-efficiency filter in the mechanically-driven flow passage. The baffle is against the two straight springs 23, while the other ends of the springs are fixed on the screw 25. The cam 22 and cam rotating shaft 26 are located in the naturally-driven flow passage. The position limiting nut 24 can adjust the compression rate of straight spring 23. When the baffle is closed, adjusting the position limiting nut 24 to make the spring in a compressed state, which enhances the sealing of the baffle. During mode switching, the cam can be rotated to open the by-pass baffle 21. The double springs and cams ensure firm structure and better sealing effect.

Figure 7:
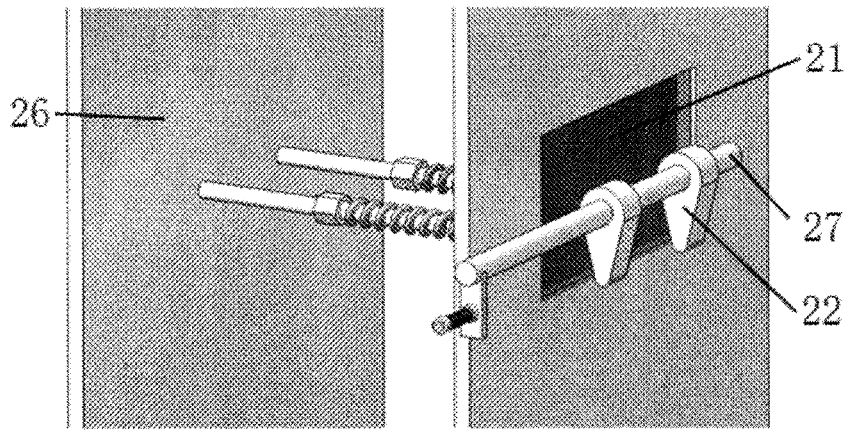
FIG. 7 is a schematic view of the handle connection with the cam for rotation.

FIG. 7 is a schematic view of the handle connection with the cam for rotation. Two cams 22 are pivoted on the cam rotating shaft 27 for rotation. The handle 25 in the room can drive the rotation of the cam rotating shaft 27. FIGS. 8(a) and 8(b) are overall schematic views of the handle position when the baffle is closed or opened, respectively. The rotating cam is locked by a position limiting block 30. FIGS. 9(a) and 9(b) are side view of the handle's position when the baffle is closed or opened, respectively. Twisting the spring lock 29 can make the shrapnel 31 expand or contract. As shown in the left picture (FIG. 9(a)), the handle 28 can be rotated when the shrapnel contracts. When the shrapnel is rotated to a proper position, the spring lock 29 can be twisted again to expand the shrapnel 31 for locking.

Figure 11:
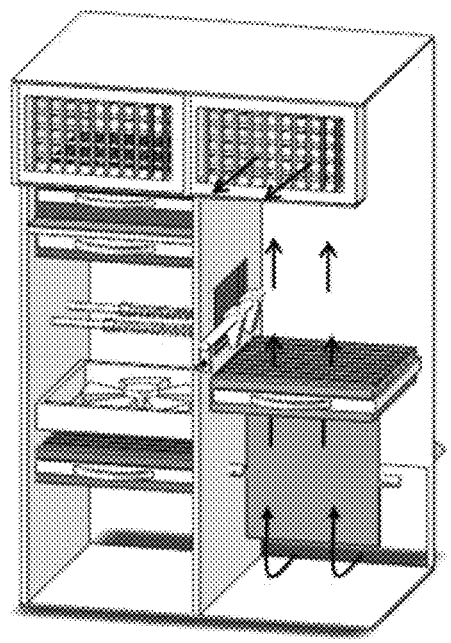
FIG. 11 is a front view of the mode of single-effect natural filtration of the outdoor air.

FIGS. 10 and 11 are diagrams for the mode of single-effect natural filtration of the outdoor air. The mode of single-effect natural filtration of the outdoor air is suitable for mild outdoor air pollution when the outdoor wind speed is large enough. As shown in these figures, in this mode, the by-pass baffle is closed. The outdoor air enters into the outdoor air intake in the naturally-driven flow passage 16, passes the flow rate regulation baffle 9, then the primary-efficiency filter B 8, and finally reaches indoors after leaving the grille B 7 on the indoor side of the naturally-driven flow passage.

Figure 12:
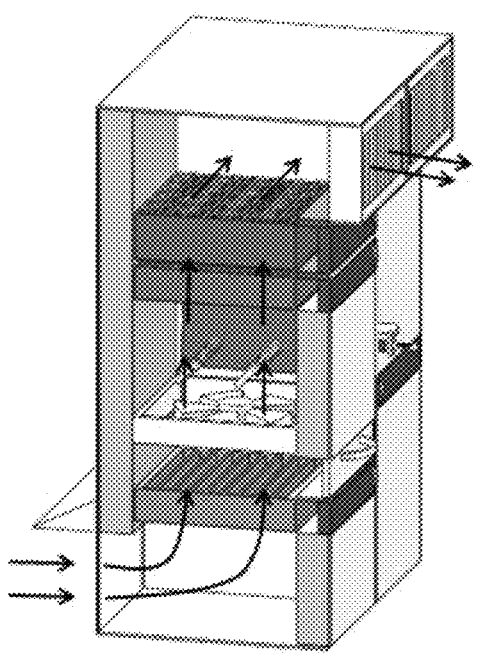
FIG. 12 is a side view of the mode of three-effect mechanical filtration of the outdoor air.
Figure 13:
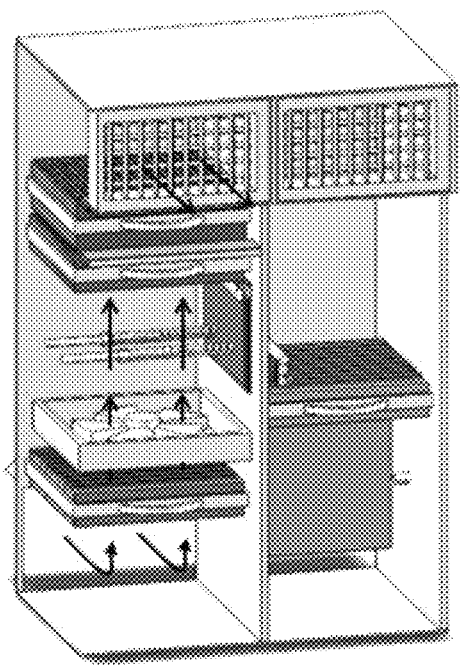
FIG. 13 is a front view of the mode of three-effect mechanical filtration of the outdoor air.

FIGS. 12 and 13 are diagrams of the mode of the three-effect mechanical filtration of the outdoor air. This mode is suitable for moderate to severe outdoor air pollution. The by-pass baffle is closed in this mode. Under the driving of centrifugal fan 3, the outdoor air enters into the air intake 17, passes the primary-efficiency, medium-efficiency, and HEPA filters sequentially, and then reaches indoors after leaving grille A 6 on the indoor side of the mechanically-driven flow passage.

Figure 14:
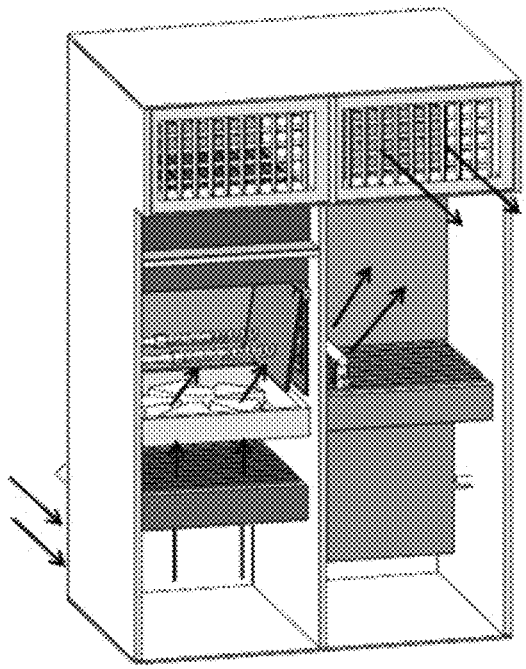
FIG. 14 is a front view of the mode of single-effect mechanical filtration of the outdoor air.

FIG. 14 is a diagram of the mode of single-effect mechanical filtration of the outdoor air. This mode is suitable for mild outdoor air pollution, when the outdoor wind speed is small or the room needs rapid ventilation. As shown in FIG. 14, the by-pass baffle 21 is opened when running this mode. Under the driving of the centrifugal fan 3, the outdoor air enters into the outdoor air intake in the mechanically-driven flow passage, passes the primary-efficiency filter A 1 firstly. Because of the large resistance of the medium-efficiency and HEPA filters above, the air is pressed into the naturally-driven flow passage from the mechanically-driven flow passage when the baffle opens. Inside the naturally-driven flow passage, due to flow resistance of the primary-efficiency filter B 8, the air goes upward to the grille B 7 and reaches indoors.

Figure 15:
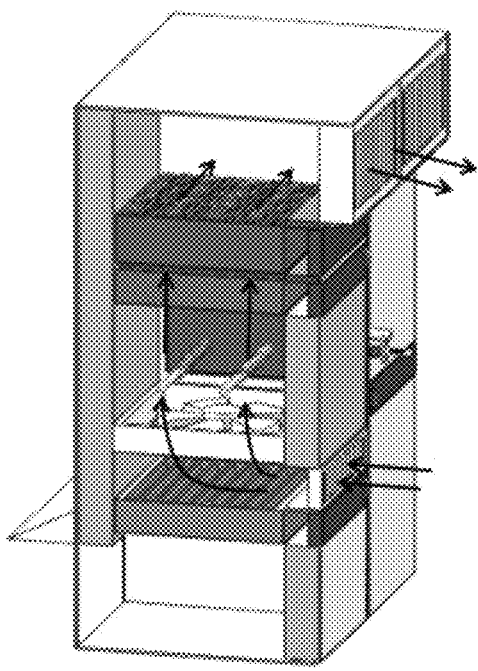
FIG. 15 is a side view of the mode of recirculated indoor air filtration.
Figure 16:
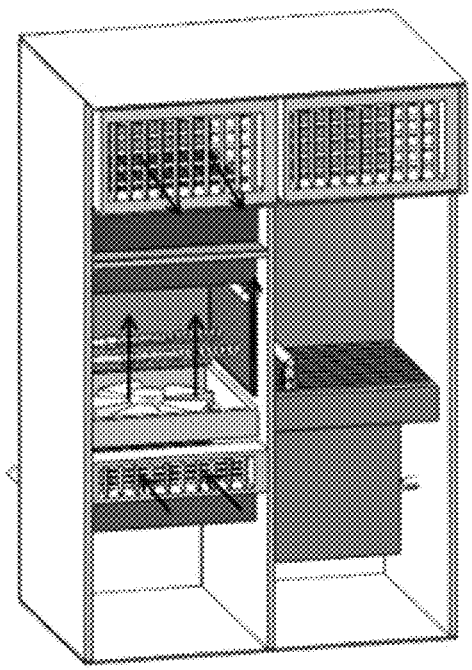
FIG. 16 is a front view of the mode of recirculated indoor air filtration.

FIG. 15 is a diagram of the mode of recirculated indoor air filtration. This mode is suitable for heavy indoor air pollution when the outdoor ventilation is not required for a short while. The by-pass baffle 21 is closed, but the recirculated indoor air intake 2 and the centrifugal fan 3 are in use. Because of the flow resistance of the primary-efficiency filter A1, the fan draws air into the mechanically-driven flow passage from the indoor space. After filtered by the medium-efficiency and HEPA filters, the air passes grille A 6 and reaches indoors.

The invention claimed is:

1. A ventilator with dual flow passages, wherein the ventilator is divided into a mechanically-driven flow passage and a naturally-driven flow passage with a partition board; there is a mode switcher on the partition board, and the mode switcher includes a by-pass baffle and a controller to open or close the by-pass baffle; when the by-pass baffle is shut, the operating mode can be the single-effect natural filtration of the drawn outdoor air, three-effect mechanical filtration of the outdoor air, or the recirculated indoor air filtration; when the by-pass baffle is opened, the mode of single-effect mechanical filtration of the outdoor air is run;

the naturally-driven flow passage contains a flow rate regulation baffle, primary-efficiency filter B and grille B; an outdoor air intake in the naturally-driven flow passage is located in the outdoor side of the bottom of the naturally-driven flow passage; the flow rate regulation baffle is pivoted at the bottom of the naturally-driven flow passage through a rotating shaft; the primary-efficiency filter B is above the flow rate regulation baffle; the grille B is located in the indoor side of the naturally-driven flow passage and above the primary-efficiency filter B;

the mechanically-driven flow passage contains a primary-efficiency filter A, a recirculated indoor air intake a centrifugal fan, a medium-efficiency filter, a HEPA filter and grille A; an outdoor air intake in the mechanically-driven flow passage is at the bottom of the mechanically-driven flow passage in the outdoor side; above the air intake in the mechanically-driven flow passage, the primary-efficiency filter A, centrifugal fan, medium-efficiency filter, and HEPA filter are located sequentially; the recirculated indoor air intake are located in the indoor side between the primary-efficiency filter and the centrifugal fan; the grille A is located on the indoor side of the mechanically-driven flow passage above the HEPA filter;

the mode switcher is arranged above the primary-efficiency filter B in the naturally-driven flow passage; the mode switcher is also located between the centrifugal fan and the medium-efficiency filter in the mechanically-driven flow passage; the opening or shutting of the by-pass baffle is controlled manually or automatically by electrical devices.

2. The ventilator with dual flow passages according to claim 1, wherein the by-pass baffle of the mode switcher is mounted at the opening on the partition board by the baffle rotating shaft and torsion spring; a sealing pad is arranged along the perimeter of the by-pass baffle to ensure good sealing of the by-pass baffle when the by-pass baffle is closed, the baffle controller contains cams, cam rotating shaft, straight springs, screws, spring locks, position limiting blocks, spring blades and handles; the cam is pivoted on the cam rotating shafts for rotation, and rotates together with the cam, and the by-pass baffle is closed when the cam is not rotated for use; the cam rotating shaft is parallel with the by-pass baffle and is located in the naturally-driven flow passage; one end of the cam rotating shaft is mounted to the outer shell of the ventilator and the other end of the rotating shaft passes through the inner shell of the ventilator and is connected to a handle; the spring lock and spring blade are arranged on the handle, and is coordinated with the position limiting block located on the shell of the ventilator indoor side to adjust the rotation angle of the cam; the screws are perpendicular to the by-pass baffle and located in the mechanically-driven flow passage; one end of the screw is mounted to the flow passage's surface, and the other end is coated with a straight spring; the spring is against a position limiting nut; the by-pass baffle is pressed by the other end of the straight spring.

3. The ventilator with dual flow passages according to claim 1, wherein the reset state of the flow rate regulation baffle is in a vertical status; meanwhile, the gravitational center of the flow rate regulation baffle is located below the rotating shaft, and the lower section of the flow rate regulation baffle is near the air intake in the naturally-driven flow passage; the rotating angle of the flow rate regulation baffle is limited to 0-90 degrees.

4. The ventilator with dual flow passages according to claim 1, wherein the flow resistance and the particle removal efficiency of the primary-efficiency filter A, medium-efficiency filter and HEPA filter are increasing sequentially.

5. The ventilator with dual flow passages according to claim 3, wherein the flow resistance and the particle removal efficiency of the primary-efficiency filter A, medium-efficiency filter and HEPA filter are increasing sequentially.

6. The ventilator with dual flow passages according to claim 2, wherein the reset state of the flow rate regulation baffle is in a vertical status; meanwhile, the gravitational center of the flow rate regulation baffle is located below the rotating shaft, and the lower section of the flow rate regulation baffle is near the air intake in the naturally-driven flow passage; the rotating angle of the flow rate regulation baffle is limited to 0-90 degrees.

7. The ventilator with dual flow passages according to claim 2, wherein the flow resistance and the particle removal efficiency of the primary-efficiency filter A, medium-efficiency filter and HEPA filter are increasing sequentially.

8. The ventilator with dual flow passages according to claim 2, wherein the flow resistance and the particle removal efficiency of the primary-efficiency filter A, medium-efficiency filter and HEPA filter are increasing sequentially.

9. A method for mode switching of ventilator with dual flow passages according to claim 1, wherein mode for single-effect natural filtration of the outdoor air is as follows: the outdoor air enters into the outdoor air intake in the naturally-driven flow passage, passes the flow rate regulation baffle, the primary-efficiency filter, and reaches indoors after leaving the grille; the centrifugal fan, by-pass baffle, and the recirculated indoor air intake are not in use;

mode of three-effect mechanical filtration of the outdoor air is as follows: the outdoor air enters into the outdoor air intake in the mechanically-driven flow passage, passes the primary-efficiency, middle-efficiency and HEPA filters sequentially under the driven motion of the centrifugal fan, and then reaches indoors after leaving the grille on the inner side of the mechanically-driven flow passage; the by-pass baffle and the recirculated indoor air intake are closed;

mode of single-effect mechanical filtration of the outdoor air is as follows: the outdoor air enters into the outdoor air intake in the mechanically-driven flow passage, passes the primary-efficiency filter under the driven motion of the centrifugal fan, then the by-pass baffle into the naturally-driven flow passage, and finally reaches indoors after leaving the grille; the recirculated indoor air intake is closed;

mode of recirculated indoor air filtration is as follows: the centrifugal fan draws the indoor air into the mechanically-driven flow passage, and then the air passes the medium-efficiency and HEPA filters, and finally reaches indoors after leaving from the grille on the inner side of the mechanically-driven flow passage.

\* \* \* \* \*